United States Patent [19]

Sant'Anselmo

[11] Patent Number: 4,972,475

[45] Date of Patent: Nov. 20, 1990

[54] AUTHENTICATING PSEUDO-RANDOM CODE AND APPARATUS

[75] Inventor: Carl Sant'Anselmo, Rancho Palos Verdes, Calif.

[73] Assignee: Veritec Inc., Chatsworth, Calif.

[21] Appl. No.: 306,212

[22] Filed: Feb. 3, 1989

Related U.S. Application Data

[63] Continuation of Ser. No. 13,026, Feb. 10, 1987, abandoned.

[51] Int. Cl.⁵ .......................... G09C 5/00; G09C 3/00
[52] U.S. Cl. .......................................... 380/54; 380/23; 380/27; 380/46; 380/50
[58] Field of Search ...................... 380/42, 46, 50, 54, 380/23, 27

[56] References Cited

U.S. PATENT DOCUMENTS

| 3,506,783 | 4/1970 | Mo et al. | |
|---|---|---|---|
| 3,894,756 | 7/1975 | Ward | 283/70 |
| 3,925,611 | 12/1975 | Dennis | |
| 4,159,468 | 6/1979 | Barnes et al. | |
| 4,447,672 | 5/1984 | Nakamura | |
| 4,591,704 | 5/1986 | Sherwood et al. | 235/380 |
| 4,614,366 | 9/1986 | North et al. | 283/70 |
| 4,660,221 | 4/1987 | Dlugos | 380/23 |

FOREIGN PATENT DOCUMENTS 0081316  6/1983  European Pat. Off. .
0155982  10/1985 European Pat. Off. .

OTHER PUBLICATIONS

Newsweek; Apr. 21, 1986.
M. Neubarth, Popular Science, Apr. 1986, p. 103.

*Primary Examiner*—Stephen C. Ruczinski
*Attorney, Agent, or Firm*—Staas & Halsey

[57] ABSTRACT

A matrix code generating method generates a first predetermined code in binary form. A second step permutes the first determined code according to a non-linear feedback method described as pseudo-random. The code is segmented with linear segments positioned in a two dimensional matrix array. Apparatus generates and permutes the code, and segments the resultant code into matrix array form. Apparatus encrypts such information onto objects, photo-optically reads such encrypted information and deciphers the coded information.

24 Claims, 3 Drawing Sheets

AUTHENTICATING PSEUDO-RANDOM CODE AND APPARATUS

This is a continuation of co-pending application Ser. No. 13,026 filed on Feb. 10, 1987.

BACKGROUND OF THE INVENTION

1. Field of the Invention

This invention relates to the art of encrypting and encoding information onto objects, and more particularly relates to the encryption of, material handling of, and authenticating information onto objects in matrix array form having such a large number of code sequence possibilities as to preclude unauthorized deciphering.

2. Description of the Prior Art

In the past, it has been known to encrypt or encode information onto objects and printing surfaces in black, white and shaded areas, known commonly as bar codes. In such arrangements and systems, vertical lines of varying relative or precisely determined widths are encoded onto the object having spaces between the vertical lines. An optical scanner passes perpendicularly over the row of encoded vertical lines comprising the bar code, sets up a reference starting line in the case where the lines are of relative widths, measures the remaining bars and spaces in relation to the starting reference, converts the scanned information into, usually, a binary form in which form the information is processed by conventional processing systems performing algorithms to arrive at some usable information.

Such bar codes are used for product identification, product authentication and verification, process control for assisting in, for example, materials handling and for encoding certain information relating to the object, such as a product that can be used by, for example, a check-out clerk when the information is properly retrieved.

Conventional bar codes represent a significant improvement in storing information directly onto objects. Such codes, however, are inherently limited by physical spacing on the object itself, and are further limited to a certain extent by the requirement for spacing between the vertical lines or bars in the bar code row. There must be sufficient spacing between the bars so that the scanner can properly distinguish between the succeeding bars, and their relative widths when scanning at a fast pace. Moreover, the row of bars and spaces comprises itself a physical limitation in that the object encoded has finite dimensions.

When used as a code for authenticating and verifying an object, the space limitations inherent in the bar code concept ultimately limit the number of choices of a unique identifier or for encoded data to be placed on the object.

While improvements in the bar printing techniques and improvements in the scanning circuits and optical equipment will undoubtedly result in putting more information in less and progressively less space, the physical limitations inherent in the linear row coding concept will inevitably limit the amount of information capable of being stored in such a code arrangement.

A variation on the bar code concept or scheme may be seen in U.S. Pat. No. 3,643,068 to Mohan, et al., where the bars are arranged having a common connecting point. The bars and spaces appear, therefore, to be emanating as radial spokes from a center. Such a code arrangement apparently does not require a set or particular orientation for the commencement of the optical scan. Such an arrangement must have the same bar and space widths required by more conventional bar codes in order for the scanning devices to properly distinguish between the bars and spaces and the relative varying widths of each within the bar code scheme.

Further variations of the bar code concept or scheme can be seen in U.S. Pat. No. 3,995,741 to Henderson and U.S. Pat. No. 4,489,318 to Goldman. In Henderson, a system for optical recognition of a color code is described. In Goldman, a unique physical phenomenon, such as the translucency of a material object is measured and used for later authentication.

Bar code encrypting devices generally make some use of, among other things, shift registers for implementing the algorithms for encoding and for processing the scanned information picked off the bar code. Reference is made herein to Golomb, S. W., "Shift Register Sequences," Aegean Park Press (1982), which describes several methods for using such technology to advantage.

It is currently sought, however, to provide a coded encryption apparatus and method that expands significantly the amount of information capable of being stored in a relatively small space available on objects, such as vendable products and their packaging. Further, it is sought to provide apparatuses and methods for greatly enhancing the available choices for a verification and authenticating code for encryption in small areas on objects.

SUMMARY

In brief, in accordance with one aspect of the present invention, information from an information source is digitized into binary bit form, and processed by software algorithm to generate a first code. The signals comprising the first code are processed by a software algorithm to generate a second code derivative of the first code. The signals comprising the second code are plotted on a Cartesian coordinate position, delivered by means of a modem or otherwise interfaced to a printing device.

The code is printed upon an object for authentication or material handling purposes. The code is read by a code reader, which comprises a photoptical detector and photo source. The signals from the read code are decoded in accordance with the known code generating scheme, and are compared for authentication or process handling instructions.

The digitized, binary information is initially, in the code generation, sequentially input into a shift register and divided into discrete segments. The signals of a discrete segment of the shift register are fed to a feedback type shift register capable of processing an algorithm for generating a code resulting from the original binary signals. An individual feedback shift register exists for each of the segments of the first shift register.

The code generated by the plurality of the feedback shift registers are fed to parallel segments of a second shift register, in which the signals of each segment are permuted by a second algorithm scheme to produce yet a second code based upon the first code. The second code is placed in a third stage, linear shift register where, in accordance with an algorithm instruction, the signals are plotted on a matrix or Cartesian coordinate system.

Other novel features which are believed to be characteristic of the invention, both as to organization and method of operation, together with further objects and advantages thereof, will be better understood from the following description considered in connection with the accompanying drawings in which the preferred embodiment of the invention is illustrated by way of example. It is to be understood, however, that the drawings are for the purpose of illustration and description only, and are not intended as a definition of limits for the invention.

DESCRIPTION OF THE PREFERRED EMBODIMENT

Figure 1:
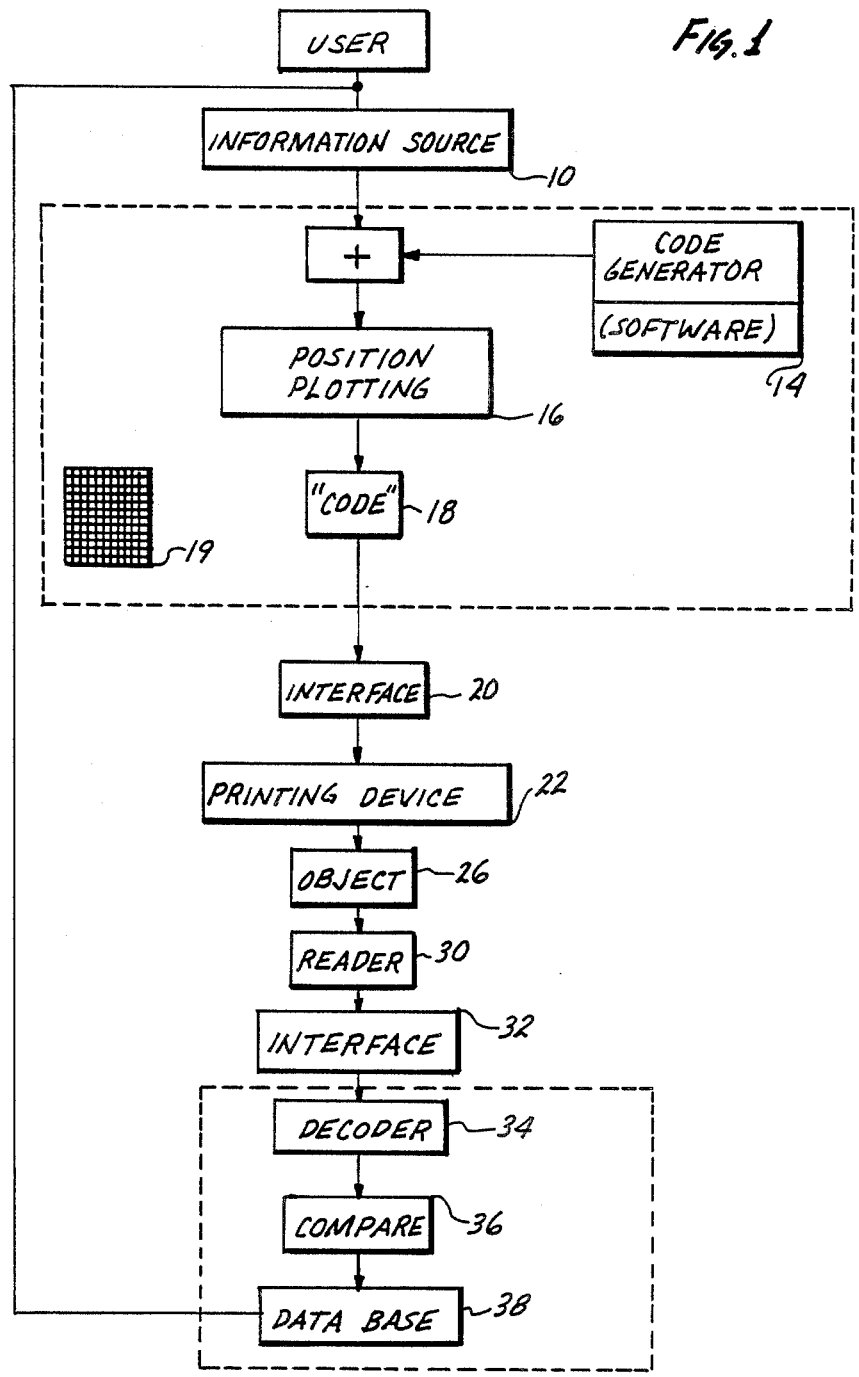
FIG. 1 is a block diagram showing a schematic of the method and apparatus system of the preferred embodiment of the present invention.

The present invention relates to a method for generating a code for encryption on objects, such as products, labels and paper. The code can be used for authentication of the object, and in alternative uses can be employed to control object handling. Initially, a user provides information in any form, indicated as an information source 10, reference being had initially to FIG. 1 of the drawings. The information is first digitized into binary form. A code generator 14 takes the binary digitized information and generates a code from the binary information. The binary information is in the form of binary bit signals arranged in a shift register, as will be explained in more detail below.

The coded information is fed to a position plotter 16. Both the position plotter 16 and the code generator 14 are shown in the preferred embodiment as being generated by software. As will be readily apparent to those skilled in the art, alternative hardware can be provided to enable the code to be generated and plotted in accordance with the method of the preferred embodiment of the invention. The position plotter 16 will arrange the resultant code in a matrix array 19 to form the ultimate code 18.

Figure 1A:
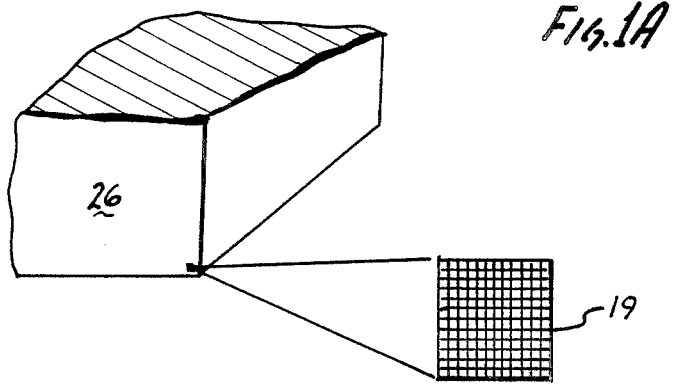
FIG. 1A is a perspective showing the encryption of the matrix code in the preferred embodiment of the present invention of FIG. 1.

The coded information from the matrix array code 18 is then fed to a printing device 22 through a modem or interface 20. The modem 20 selected is an RS-232 modem. The printer or printing device 22 will then print the code 18 onto an object 26 as a matrix of small areas either nonreflective or reflective, that is either imprinted or not imprinted squares or dots in a two dimensional array having a first Cartesian direction and a second Cartesian direction producing a two dimensional spatial matrix pattern. The object 26 can be a product as shown in FIG. 1A, or can be a label or paper.

Figure 1B:
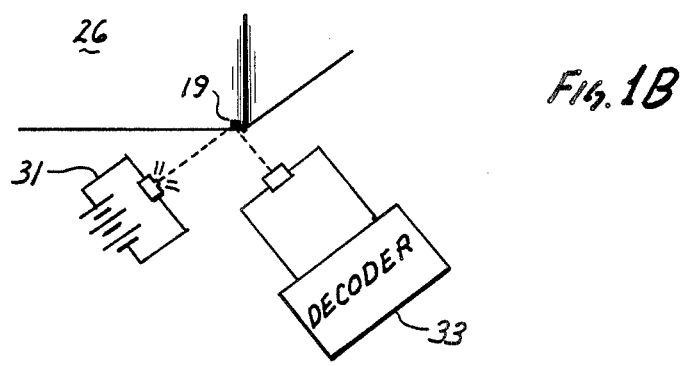
FIG. 1B is a partial schematic of a reader and decoder of the preferred embodiment of the present invention of FIG. 1.

In accordance with the preferred embodiment of the invention, the object 26 can be read by a reader 30, such as a photo-optical reading detector comprising a light source 31 and photodetector 33 in the light path for distinguishing between reflective and nonreflective areas on the imprinted matrix array, as shown in FIG. 1B. The information picked up by the reader can be fed through an appropriate modem interface 32 to a decoder 34. The decoder 34 will reverse the code generation of the code generator 14 to produce the original user information provided from the information source 10. This information may be in the original form of information source 10, or could be in the digitized binary form as read. The decoded or deciphered information is then compared in the comparator 36 for verification of the object 26 on which the code 18 has been imprinted. Alternatively, the information fed into the comparator 36 could be used to operate with or on the object 26 in a material handling or product handling scheme or arrangement. The information from the comparator 36 is then fed to a database 38 for further operation and report back to the user.

Figure 2:
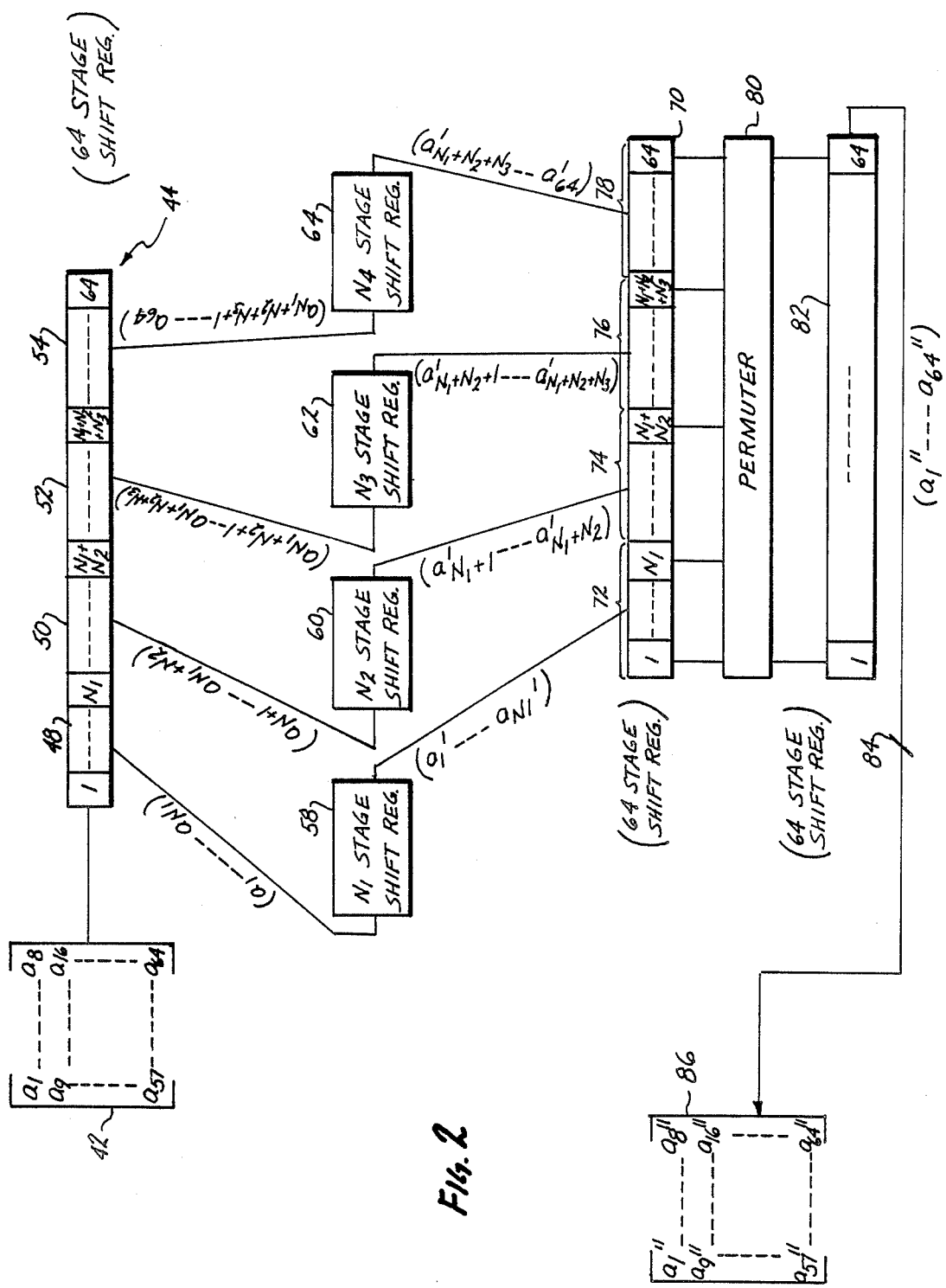
FIG. 2 is a block diagram of a code generator of the system of the preferred embodiment of the invention as seen in FIG. 1.

Referring to FIG. 2, a block diagram or schematic of the code generator 14 of the preferred embodiment of the invention is shown in greater detail. The digitized information from the information source 10 is shown in binary form in a matrix array 42. The information is arranged linearly and fed into a 64-stage shift register 44. For convenient operational purposes, the shift register 44 is divided into discreet segments, the first segment 48 comprising the first through $N_1$ stages, the second segment 50 comprising the stages from $N_1$ to and including $N_2$, the third segment 52 comprising stages from $N_2$ to and including $N_3$, and the fourth segment 54 comprising stages from $N_3$ to and including 64, where "N" represents an arbitrarily selected integer.

The first segment 48 of the shift register 44 has the information contained therein fed to shift register 58 having $N_1$ stages. Shift register 58 is a feedback shift register capable of implementing a feedback algorithm as will be described in greater detail below.

Shift register 60 is a feedback shift register similar to shift register 58 and capable of implementing a feedback algorithm. Shift register 60 has $N_2-N_1$ stages. Similarly, shift register 62 is a feedback shift register capable of implementing a feedback algorithm as shift register 58, and has $N_3-N_2$ stages. Shift register 64 is also a feedback shift register capable of implementing a feedback algorithm, and having 64 - $N_3$ stages.

Shift register 58 will shift the binary bit signals in accordance with the feedback algorithm, as explained in greater detail below, and feeds the so-adjusted signal information to a corresponding segment 72 in 64 stage shift register 70. Similarly, the information in shift register 60 resulting from the feedback algorithm is fed to segment 74 of shift register 70. In like manner, the resulting binary signals of the feedback algorithm implementation in, respectively, shift registers 62 and 64 are fed to corresponding segments 76 and 78 of shift register 70. The segment 72 of shift register 70 comprises $N_1$ stages. The segment 74 comprises $N_2-N_1$ stages. The segment 76 comprises $N_3-N_1$ stages. The segment 78 of shift register 70 comprises 64 - $N_3$ stages, so that shift register 70 corresponds in a segmented division to the segments dividing shift register 44.

The signal of each stage in the 64 stage shift register 70 is permuted in permuter 80. The permuted signal is then placed in shift register 82 to result in a 64 bit binary signal 84. The signal 84 is divided into eight (8) stages or segments arranged vertically to form the matrix array 86. The matrix array 86 comprises the code to be imprinted or encoded upon the object 26, as set forth above.

The feedback algorithm implemented by the feedback shift registers 58, 60, 62, 64 comprises a non-linear feedback algorithm initially shifting all of the bits one stage to the left from the least significant bit to the most significant bit, but replacing the most significant bit with a bit which is the modulo-2 sum of a bit determined by a selected or particular choice of a maximal length linear feedback algorithm as described by Golomb, identified and cited above, and a bit which is the product of the complements of all bits but the least significant bit.

An example for the case of a six bit register is a feedback algorithm consisting of shifting all bits one stage to the left but replacing the least significant bit by the modulo-2 sum of the least two significant bits and:

$$X_2'X_3'X_4'X_5'$$

i.e. $X_6^1$ (MSB after the shift) is replaced by $(X_1+X_2)+X_2'X_3'X_4'X_5'$ before the shift where $X_i$ represents the $i^{th}$ significant stage or digit ("i"=2-5), "+" is a modulo-2 addition (Exclusive OR), and "'" represents a complement.

The result of the feedback algorithm used in the preferred embodiment in the feedback shift registers 58, 60, 62, 64 is set forth in tabular form for a 6-stage shift register in Table 1 set forth below where N=6 for the representative example. In this Table 1, the succession of shift register states or arrays appearing in the six stage shift register as a result of successive applications of the feedback algorithm example described hereinabove, is set forth. Such a 6-stage shift register can represent numbers from 1 to $[2^6-1]$ or 63. The effect of the special instruction is to replace the most significant digit or stage with a 0 in the case where all but the least significant stages are 0. In this manner, the seventh shift register state 64th number, comprising all zeros is made part of the available code members for this first stage of the code.

TABLE 1

| State No. | Sequential Shift Register States | State No. | Sequential Shift Register States |
|---|---|---|---|
| 1 | 111111 | 33 | 100011 |
| 2 | 111110 | 34 | 000111 |
| 3 | 111100 | 35 | 001110 |
| 4 | 111000 | 36 | 011100 |
| 5 | 110000 | 37 | 111001 |
| 6 | 100000 | 38 | 110010 |
| 7 | 000000 | 39 | 100100 |
| 8 | 000001 | 40 | 001001 |
| 9 | 000010 | 41 | 010010 |
| 10 | 000100 | 42 | 100101 |
| 11 | 001000 | 43 | 001011 |
| 12 | 010000 | 44 | 010110 |
| 13 | 100001 | 45 | 101101 |
| 14 | 000011 | 46 | 011011 |
| 15 | 000110 | 47 | 110111 |
| 16 | 001100 | 48 | 101110 |
| 17 | 011000 | 49 | 011101 |
| 18 | 110001 | 50 | 111011 |
| 19 | 100010 | 51 | 110110 |
| 20 | 000101 | 52 | 101100 |
| 21 | 001010 | 53 | 011001 |
| 22 | 010100 | 54 | 110011 |
| 23 | 101001 | 55 | 100110 |
| 24 | 010011 | 56 | 001101 |
| 25 | 100111 | 57 | 011010 |
| 26 | 001111 | 58 | 110101 |
| 27 | 011110 | 59 | 101010 |
| 28 | 111101 | 60 | 010101 |
| 29 | 111010 | 61 | 101011 |
| 30 | 110100 | 62 | 010111 |
| 31 | 101000 | 63 | 101111 |
| 32 | 010001 | 64 | 011111 |

It may be appreciated by those skilled in the art that many variations of the more simple, non-linear feedback algorithm represented in Table 1 can be devised while maintaining the simple correlations set forth. There exists many alternative choices for the linear maximal length feedback algorithm used. The corresponding number represented by the resultant byte of the shift register 58 after implementation of the feedback algorithm could be inverted, or could be transmitted straight to the corresponding segment 72 in the shift register 70.

As further alternative embodiments, any number of more non-linear feedback algorithms may be employed to generate the first code in the two code generation methods of the present invention. For further example, the feedback algorithm in the shift registers 58, 60, 62, 64 could be shifted any predetermined number, up to $N_5$, but otherwise employing the feedback algorithm as explained above in Table 1. There are, for further example, six possible logic polynomials for defining the most significant digit replacement, five in addition to that set forth in the example above. The other five polynomials are:

$$X_6 = X_4 + X_3X + 1$$

$$X_6 = X_5 + X_2X_1 + 1$$

$$X_6X_5 + 1$$

$$X_6 = X_5 + X_3 + X_2 + 1$$

$$X_6 = X_5 + X_4 + X + 1$$

The last two polynomials are seen as the inverses of the first two polynomials listed, and the third polynomial is seen as the inverse of the polynomial used to define the example of Table 1 set forth above.

The second code generation resulting from the permuting of the bytes of shift register 70 by the permuter 80 can be anyone of a large number of permutations of each bit in the 64 stages of shift register 70. The permutation could be a straight, or an inverse transmittal of each bit from the corresponding stage of shift register 70 to the corresponding stage of shift register 82. Any tabular correspondence of the ordinary binary bit number can be used as the permutation translation.

It can be seen that all of these permutations leave no number fixed, and that the separation between each number and its permutational image is uniformly distributed. One can generate a large family of permutations starting with any one of the permutations indicated. All permutation of the numbers 1 through 64 can be determined leaving a given array of binary decimal digits fixed, and which are distinct and have the seeming pseudo-randomness seen by the example given above.

From the foregoing it can be appreciated that security against deciphering or "cracking" the code is provided by the fact that the effects of the permutation of permuter 80 and of the non-linear shift register logics or algorithms of shift registers 58, 60, 62, 64 mask each other, as well as providing for an unusually large number of logical code generations from the original information source 10 so as to present a numerically insurmountable hurdle to "reverse" deciphering. Where each feedback shift register 58, 60, 62, 64 has a non-linear feedback algorithm or logic, an N-stage register has the following number of possible logic results:

$$2\exp((2\exp(N-1))-N).$$

In addition, each permutation has the same number of possible permutations. For a representative example, where a shift register 58, 60, 62, 64 having 16 stages is chosen, as shown in FIG. 2 and discussed above, the number of possible algorithms N(A) is:

$$\begin{aligned} N(A) &= [2\exp(2\exp(15) - 16)] \exp 4 \times 2\exp((2\exp 5) - 6) \\ &= 2\exp((2\exp(17) - 38) \\ &= 10\exp(39, 464) \text{ (approximately)}. \end{aligned}$$

The foregoing detailed description of our invention and of preferred embodiments, both as to apparatus and as to method, is illustrative of specific embodiments only. It is to be understood, however, that additional embodiments may be perceived by those in the art. The embodiments described herein, together with those additional embodiments, are considered to be within the scope of the present invention.

We claim:

1. A method for encrypting a code in a matrix array, comprising the steps of:
   (a.) generating a first code having a series of signals;
   (b.) permuting said signals to form a second code in a pseudo-random scheme including nonlinear feedback permutations and producing a representation of a two dimensional spatial matrix pattern of the second code having a plurality of signal locations in a first Cartesian direction and a plurality of locations in a second Cartesian direction; and
   (c.) printing, from the representation, a two dimensional spatial matrix pattern of light reflective and non light reflective portions arranged according to said permutations on a surface of a substrate.

2. A method of encrypting a code in a matrix array, comprising the steps of:
   a. generating a first code having a series of signals, said first code being generated by the steps of:
      a1. digitizing information sought to be encrypted into a binary code form of at least m bits;
      a2. inputting said binary code in increments of no more than n bits each into a n-bit shift register where n is less than and integer divisible into m; and
      a3. shifting all bits a predetermined number of bit locations within said shift register;
   b. permuting said signals to form a second code in a pseudo-random scheme producing a two dimensional spatial matrix pattern of the second code having a plurality of signal locations in a first Cartesian direction and a plurality of locations in a second Cartesian direction; and
   c. imprinting the two dimensional spatial matrix pattern on a substrate.

3. The method of claim 2 where in the step of shifting all bits, further comprises the step of replacing the most significant bits in a sequence by a function of the least significant bits.

4. The method of claim 3 where in the step of shifting all bits, replacing the most significant bits as they are sequentially shifted by the modulo-2 sum of the lesser significant bits at the time increment immediately prior to shifting.

5. The method of claim 2 wherein said pseudo-random scheme is predetermined and said second code is generated according to said pseudo-random scheme which is stored into a retrievable memory, and further comprising the step of deciphering said code using said pseudo-random scheme.

6. The method of claim 5 further comprising the step of comparing the deciphered code with the series of signals comprising said first code.

7. The method of claim 5 wherein said pseudo-random scheme comprises an algorithm which permutes each of said n bits of said first code according to a predetermined permutation scheme and feeds back each permuted bit into said shift register.

8. The method of claim 7 further comprising the step of dividing said m bits into a series of segments, the sum of bits in the segments equalling m and sequentially arranging said segments into a matrix of bits representative of binary signals.

9. The method of claim 8 further comprising the step of encrypting said matrix onto an object.

10. The method of claim 7 wherein said pre-determined scheme is non-linear.

11. An encryption device capable of generating a set of decipherable information for encryption in a matrix array form, comprising:
    (a.) means for generating a plurality of signals comprising a first code;
    (b.) means for permuting said signals into a pseudo-random scheme including nonlinear feedback permutations and producing a representation of a two dimensional spatial matrix pattern of the second code; and
    (c.) means for printing, from the representation a, two dimensional spatial matrix pattern of light reflective and non-light reflective portions arranged according to said permutations on a surface of a substrate.

12. An encryption device capable of generating a set of decipherable information for encryption in a matrix array form, comprising:
    (a.) means for generating a plurality of signals comprising a first code, said code generating means comprising means for digitizing information sought to be encrypted into binary code form having a set of binary signals and at least m bits;
    (b.) means for permuting said signals into a pseudo-random scheme producing a two dimensional spatial matrix pattern of the second code;
    (c.) means for imprinting the two dimensional spatial matrix pattern on a substrate;
    (d.) a shift register capable of processing n bits at a time where n is less than an integer divisible into m;
    (e.) means for inputting said binary code in increments of no more than n bits each into said n-bit shift register; and
    (f.) an algorithm operatively connected to said shift register for running instruction sequences in said shift register and having a program for shifting said binary signals according to a predetermined scheme into a second code.

13. The encryption device of claim 12 further comprising means for shifting all bits one bit position and replacing the most significant bit by bits determined by a function of a determined number of the least significant bits.

14. The encryption device of claim 13 wherein said means for replacing the most significant bit comprises a function generating means for generating the modulo-2 sum of the lesser significant bits for replacing the most significant bit prior to any shift.

15. The encryption device of claim 12 wherein said permuting means further comprises an algorithm operatively connected to said permuting means for running instruction sequences within said permuting means and having a program capable of permuting each of said binary signals of said first code according to said predetermined scheme of said permuting means algorithm, and further capable of inputing each said binary signal so permuted into a second shift register.

16. The encryption device of claim 12, further comprising means for encoding said second code into a matrix onto an object.

17. A system comprising the encryption device of claim 12 further comprising:
    (a.) means for reading said second code encoded onto said object; and
    (b.) means for deciphering said second code to produce the information originally digitized into binary code form.

18. The system of claim 17 wherein said reading means includes means for photo-optically reading said second in a matrix array on said object.

19. The system of claim 17 wherein said deciphering means includes means for decoding said second code into the set of binary signals comprising said first code, and further means for decoding said first code into said set of m bits embodying said information digitized into binary code form.

20. The system of claim 19 further comprising means for comparing said set of m bits embodying said information digitized into binary code form, with the binary code form of said information digitized.

21. An encrypted code for encoding information, said code being printed on a substrate and having portions arrayed in a two dimensional matrix pattern having at least four sides comprising dark and substantially non-light reflective portions on a surface of said substrate and comprising light and substantially light reflective portions on a surface of said substrate, wherein the light reflective portions and the non-light reflective portions are arranged in predetermined positions in a plurality of substantially linear rows, said positions being determined by an algorithm implementing at least a plurality of nonlinear feedback permutations of information to be encoded generating at least a second order of code therefrom.

22. The method of claim 2, wherein said matrix in an n by n matrix and the generation of the first code depends on a value of n.

23. The device of claim 12, wherein said matrix is an n by n matrix and said means for generating the first code generates the first code responsive to a value of n.

24. The code of claim 21, wherein said matrix is an n by n matrix and said algorithm generates the second order code dependent on a value of n.

* * * * *